United States Patent [19]

Reavely et al.

[11] Patent Number: 4,755,341

[45] Date of Patent: Jul. 5, 1988

[54] METHOD OF VACUUM BAGGING USING A SOLID FLOWABLE POLYMER

[75] Inventors: Richard T. Reavely, Madison; Peter C. Ogle, Woodbridge, both of Conn.; Robert V. Kromrey, Campbell, Calif.

[73] Assignee: United Technologies Corporation, Hartford, Conn.

[21] Appl. No.: 907,958

[22] Filed: Sep. 10, 1986

[51] Int. Cl.$^4$ .................. B29C 43/12; B29C 43/56; B29C 65/02

[52] U.S. Cl. ...................... 264/313; 264/512; 264/102; 264/257; 425/389; 425/405.2; 425/DIG. 19; 425/DIG. 44

[58] Field of Search .............. 264/102, 314, 512, 571, 264/313, 257, 137, 510; 425/389, DIG. 19, DIG. 44, 405 H, 405 R

[56] References Cited

U.S. PATENT DOCUMENTS

| | | | |
|---|---|---|---|
| 3,556,201 | 1/1971 | Sander | 425/407 |
| 3,843,601 | 10/1974 | Bruner | 260/465 |
| 4,167,430 | 9/1979 | Arachi | 264/313 |
| 4,264,556 | 4/1981 | Kumar et al. | 264/314 |
| 4,388,263 | 6/1983 | Prunty | 264/257 |
| 4,547,337 | 10/1985 | Rozmus | 264/570 |

FOREIGN PATENT DOCUMENTS 2134168 1/1987 Fed. Rep. of Germany .

OTHER PUBLICATIONS

AGM-130 Propulsion Module Proposal 84-32, vol. 3: Cost & Pricing Proposal (A).
AGM-130 Propulsion Module 84-32A (B).
Reference Reply 54-931-1934 (C).
Space Transportation System Solid Rocket Motor Second Source Stucky (D).
Air Force Checks Compatibility of Rockwell AGM-130 with F-111 (E).
FAC 7-30-87 Part 2 Definitions of Words and Terms (F).

Primary Examiner—Jan H. Silbaugh
Assistant Examiner—J. F. Durkin, II
Attorney, Agent, or Firm—A. Dean Olson

[57] ABSTRACT

A method particularly adapted for making a complex shaped composite component that has reduced bridging defects. The method comprises disposing a composite prepreg on to a substantially flat tool. The composite prepreg has a substantially flat section and at least one prepreg member extending from and substantially perpendicular to said flat section. A layer, at least about 125% of said composite prepreg height, of a said flowable particulate silicone rubber is disposed in substantially complete contact with the composite prepreg surface. The particulate silicone rubber has a flow rate of at least 0.6 gram/second through a 1.1 cm diameter pipe 7.6 cm long under applied pressure of 10.34 MPa at room temperature. The layer of solid flowable rubber is covered with a bag to effect a gas tight seal. The bag is exposed to pressures which are transferred to said prepreg by said solid flowable polymer. The composite prepreg is exposed to temperatures to form a composite component.

1 Claim, 1 Drawing Sheet

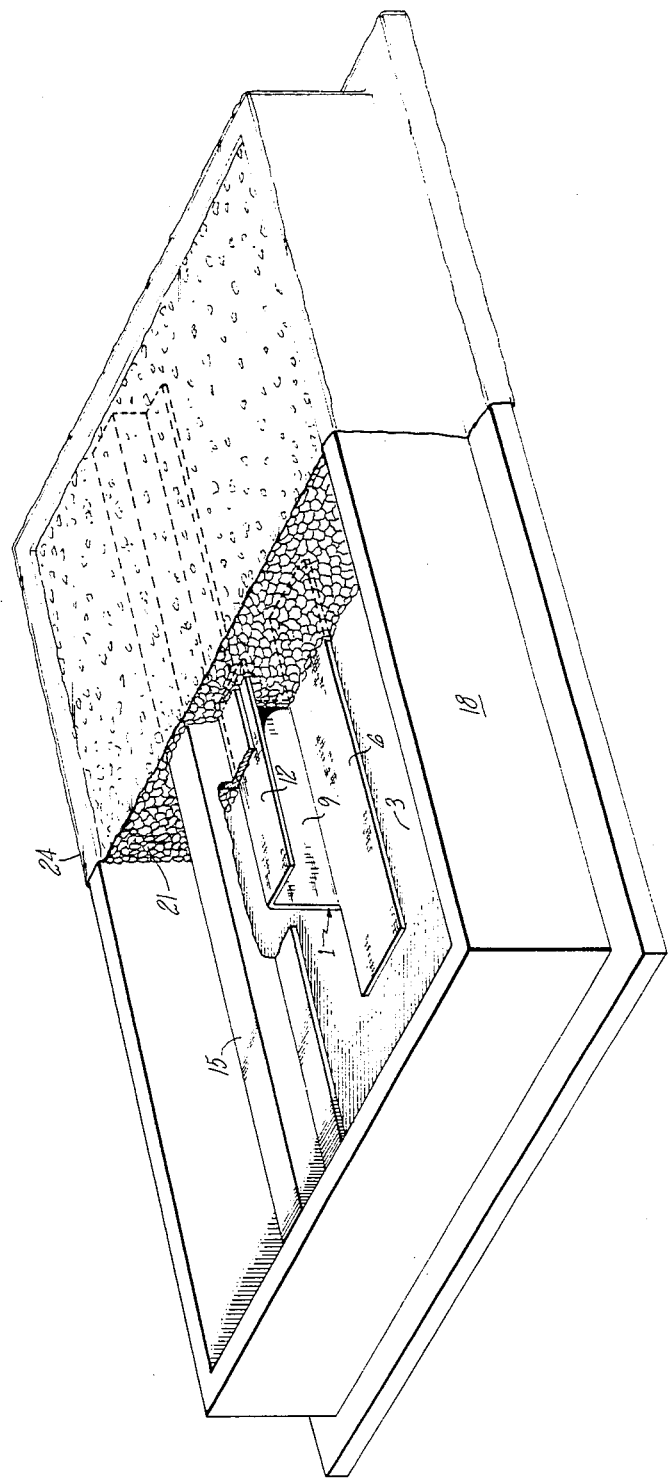

METHOD OF VACUUM BAGGING USING A SOLID FLOWABLE POLYMER

This invention was made with Government support and the Government has certain rights in this invention.

Cross Reference

This application relates to commonly assigned copending applications Ser. No. 829,048 filed Feb. 13, 1986, entitled "Molding Method and Apparatus Using a Solid, Flowable, Polymer Medium"; and Ser. No. 907,959 entitled "Solid Flowable Polymer Molding Medium"; Ser. No. 907,943 entitled "Solid Flowable Polymer Medium with Metal Additives and Method of Molding Using Same"; Ser. No. 907,946 entitled "High Temperature Solid Flowable Polymer Medium and Method of Molding Using Same"; Ser. No. 907,942 entitled "Method for Molding a Carbon-Carbon Composite"; Ser. No. 907,947 entitled "Method for Molding Using a Dual Solid Flowable Polymer System"; Ser. No. 907,952 entitled "Method for Recovering a Solid Flowable Polymer Medium"; Ser. No. 907,955 entitled "Solid Flowable Medium Having a Thermal Stability Additive and Method for Molding Using Same"; Ser. No. 907,954 entitled "Improved Method of Fabricating Tubular Composite Structures"; and Ser. No. 907,957 entitled "Solid Flowable Polymer Medium with U.V. Detectable Additive and Method for Molding Using Same", filed on even date herewith, which disclose material related to that contained herein, the disclosures of which are hereby incorporated by reference.

TECHNICAL FIELD

The field of this invention relates to methods of making composite articles.

BACKGROUND ART

Composite materials are of great current interest because they provide a very favorable combination of high strength and low density. Typically, a composite material is comprised of fibers of graphite embedded within an epoxy, phenolic or other polymer resin matrix. The more advanced composites which have particularly favorable high strength to density ratio properties are especially attractive for aerospace applications. Typical of other advanced aerospace materials, they present comparative processing difficulties; it is insufficient to make a simple layup of the fibers and resin followed by room temperature curing. Aerospace composite materials not only involve more difficult to fabricate resins but often essentially defect-free finished parts must be produced.

Typically, composite components are cured using a flexing bagging material (e.g. silicone rubber sheet, nylon film) which is sealed to a tool (mold) and is in contact typically through a layer (e.g. peel ply, breather, bleeder) with the entire exposed surface area of the composite prepreg. The curing pressure is applied to the prepreg by direct contact of the bag. However, since the entire exposed prepreg surface must be in direct contact with the bag; design options are limited to simple shapes as it is difficult to reliably "bag" complex shapes. In addition, during cure, the laminate surface in contact with the bag under application of heat and pressure moves (e.g. creeps) as it debulks. This can result in the bag bridging (thereby not applying pressure to the area underneath the "bridge") or stretching to the point of rupture resulting in loss of the part. Finally, any tooling that is required for shape definition or location must be placed in direct contact with the laminate under the bag. This also limits designs to simple shapes that can be reliably bagged.

Accordingly, there has been a constant search in this field of art for new methods of making composite components.

DISCLOSURE OF INVENTION

This invention is directed to a method particularly adapted for making a complex shaped composite component that has reduced bridging defects. The method comprises disposing a composite prepreg on to a substantially flat tool. The composite prepreg has a substantially flat section and at least one prepreg member extending from and substantially perpendicular to said flat section. A layer, at least about 125% of said composite prepreg height, of a said flowable particulate silicone rubber is disposed in substantially complete contact with the composite prepreg surface. The particulate silicone rubber has a flow rate of at least 0.6 gram/second through a 1.1 cm diameter pipe 7.6 cm long under applied pressure of 10.34 MPa at room temperature. The layer of solid flowable rubber is covered with a bag to effect a gas tight seal. The bag is exposed to pressures which are transferred to said prepreg by said solid flowable polymer. The composite prepreg is exposed to temperatures to form a composite component.

The foregoing and other features and advantages of the present invention will become more apparent from the following description and accompanying drawings.

BRIEF DESCRIPTION OF DRAWINGS

The FIGURE is a perspective view partially cutaway of the method of this invention wherein a solid flowable rubber transmits pressure from a bag to a complex shaped composite prepreg.

BEST MODE FOR CARRYING OUT THE INVENTION

The FIGURE is a perspective view of the method of fabricating a composite of this invention. A composite prepreg 1 (as described below) is disposed (placed) on a tool 3. The prepreg 1 has a substantially flat section 6 that can generally have any quadrangular shape (e.g. square, rectangular, trapezoid). The flat section is typically about 0.05 centimeter (cm) to about 0.38 cm in thickness. The flat section may not be perfectly flat, for example, a wing structure component typically is airfoil shaped. A prepreg member 9 is connected to and extends substantially perpendicular from said flat section 6. There can be a plurality of members 9 extending from the flat section and these may take a variety of shapes. These shapes may include cantilever(s) 12 such as L shapes. These shapes are typically used in semimonocouque (e.g. lightweight stiffened shell structure) construction and are especially difficult to "bag" because the bag has to conform to the complex surface geometry, however, this invention provides adequate pressure "underneath" the cantilever 12. Typically, when a member such as described above is to be cured a tool 15 is used to provide support.

Typically, a housing 18 is disposed on the tool 3 and surrounds the prepreg 1. This housing 18 is a convenient way to retain (hold) the polymer pressurizing medium described below. Alternatively, the housing 18 and tool 3 can be a unitary structure.

A layer of the solid flowable polymer 21 (described below) is disposed in contact with and on the surface of the prepreg 1 and preferably within the housing 18. Preferably, the layer is at least about 125% of the height of the composite prepreg 1 (e.g. and any height added due to a tool). This thickness compensates for the compressibility of the pressurizing polymer and thus reduces the possibility of bridging. For example, for structures 3.2 cm (1.25 inch) high a 5.1 cm (2 inch) layer of polymer 21 should be more than adequate. The polymer layer need not have a consistent height but can conform to the contours of the composite prepreg. In addition, it can be used in conjunction with conventional vacuum bagging techniques. This polymer need only be used as a pressurizing medium for those areas of a composite prepreg that can not be adquately bagged (e.g. complex shapes). There is no advantage to adding more pressurizing polymer as curing can take longer. Then the bag 24 is disposed on the polymer 21 to cover it. Generally, any conventional flexible gas impermeable membrane such as nylon, silicone or other vacuum bag material is acceptable. The bag 24 is sealed to the tool 3, housing 18 or both in order to affect a gas tight seal. An exemplary bag material is E7400 nylon bagging film available from Airtech Int. (Carson, Calif.).

The bag 24 is exposed to pressures of about 172 kiloPascals (kPa) (25 pounds per square inch (psi)) to about 1034 KPa (150 psi) typically by autoclave pressure. This pressure debulks and consolidates the composite to give a high strength laminate. The bag pressure is transferred to substantially all the surfaces of the prepreg 1 through the polymer 21. The prepreg is cured at temperatures of about 121 degrees centigrade (°C.) (250° F.) to about 175° C. (350° F.). Below about 121° C. (250° F.), the temperature is not high enough to cure typical aerospace epoxy resins the prepreg 9 within acceptable time frames. Conventional cure times at the prescribed cure temperature (vs. the entire processing cycle) are about 1 hour to about 2 hours.

Although the above method has been given in a preferred order, the order may change so long as it does not deleteriously affect the process as a whole.

This method can be utilized to make conventional composites from conventional composite precursor materials. Examples of resins include epoxy, phenolic and polyester. An example is 5225 epoxy available from Narmco (Anaheim, Calif.). Graphite fiber is an exemplary reinforcing material and prepregs of this material are available from Narmco.

The particular polymeric medium useful in the present invention is critical. Its responsiveness to temperature and pressure coupled with its flowability and solid nature at molding temperatures enable it to be useful. These properties cause the medium to produce an advantageous, substantially uniform, controllable pressure on the surface of the article precursor. By substantially uniform is meant within about 10%. In a typical embodiment of the invention, the polymer is an unfilled silicone rubber particulate of −4 to +30 U.S. mesh sieve size (4.7–0.42 millimeter (mm)), which when pressurized, is sufficiently self-compliant to coalesce as an essentially void-free medium at a pressure of the order of 69 kPa (10 pounds per square inch (psi)).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. A preferred material which has been used thus far is the experimental unfilled silicone rubber material designated as X5-8017, formerly No. 6360 81 (more simply 8017 hereinafter), by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber (Stauffer Chemical Company, Westport, Conn. USA), believed to be essentially the material which is described in the Bruner U.S. Pat. No. 3,843,601 is also useful with the present invention.

Fillers and other adulterants (such as metal particulates to increase thermal conductivity) can be included with and within the medium, provided the essential behavior properties are maintained.

The preferred 8017 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50-55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also been observed that a preferred polymer useful with the present invention forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on 40 mesh.

The aforementioned behavior of the polymer enables the fabrication of intricately shaped composite polymer parts with uniform properties under the controlled and independent application of substantially uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present media from those which have been used theretofore in the pressure pad molding technique. The flowability property can inferentially be seen to be analogous to viscosity. But there is no evident standard test known for measuring this property of importance to the invention. Therefore, a test apparatus was created comprising a cylinder having a downwardly movable piston to test the polymer portion of the medium. The cylinder is filled with the rubber or other medium being tested. A replaceable pipe test section extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32-64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MegaPascals (MPa) (1500 psi) and a 15.2 cm (6 inch) pipe, has a flow rate of at least 0.6 g/s, typically 6 g/s, and desirably more than 25 g/s.

Further description of the polymer is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. Because of this and their inherent resilience, a substantially uniform hydraulic-like pressure is applied to the article precursor surface. Tests show that the 8017 material without the metal additive will tend to coalesce upon the application of moderate compressive pressure, of the order of 70 kPa; at this point the interfacial boundaries between the particles are so essentially conformed that the compressed rubber becomes translucent instead of opaque. The 8017 material has a true density of 0.97 gram per cubic centimeter (g/cc), an apparent bulk density of 0.5 g/cc as a −30 mesh size powder, and it is compressed to a coalesced translucent material with a density of 0.94-0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurements, desirable results have been associated with mediums having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressures uniform within 10%.

As mentioned above, the tendency for the preferred rubbers to be friable is thought to be desirable.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer has only been characterized according to the properties of some currently available materials; the data are insufficient to establish that the totality of measured properties in combination are necessary. On the contrary, to a significant extent it is believed there is a redundancy and that they independently characterize the invention.

This invention can be utilized to fabricate a variety of composite parts such as airframe, wings and fittings. This invention provides a method for making complex shaped components that reduces the complexity of bagging which is labor intensive and can fail. Finally, the solid flowable particulate silicone rubber provides a substantially uniform pressure to the prepreg that facilitates the curing of composite components by reducing bag bridging in corners.

It should be understood that the invention is not limited to the particular embodiment shown and described herein, but that various changes and modifications may be made without departing from the spirit or scope of this concept as defined by the following claims.

We claim:

1. A method particularly adapted for making a complex shaped composite component comprising:
    a. disposing a composite prepreg, having a predetermined height and having a substantially flat section and having at least one prepreg member extending from said flat section and being substantially perpendicular to said flat section on to a substantially flat tool;
    b. disposing a layer, at least about 125% of said predetermined height, of a solid flowable particulate silicone rubber that has a flow rate of at least 0.6 gram/second through a 1.1 cm diameter pipe 7.6 cm long under applied pressure of 10.34 MPa at room temperature, in substantially complete contact with said prepreg surface not in contact with said flat tool;
    c. covering said layer of solid flowable particulate silicone rubber with a bag to affect a gas tight seal with means containing said prepreg and said solid flowable particulate silicone rubber; and
    d. exposing said bag to pressure whereby said solid flowable particulate silicone rubber transfers said pressure to said prepreg and exposing said prepreg while under pressure to temperatures to cure said composite prepreg to form said composite component;

wherein said composite component has reduced bridging defects.

* * * * *